US009735678B2

(12) United States Patent
Childs

(10) Patent No.: US 9,735,678 B2
(45) Date of Patent: Aug. 15, 2017

(54) VOLTAGE CONVERTERS WITH ASYMMETRIC GATE VOLTAGES

(71) Applicant: Dialog Semiconductor (UK) Limited, London (GB)

(72) Inventor: Mark Childs, Swindon (GB)

(73) Assignee: Dialog Semiconductor (UK) Limited, London (GB)

( * ) Notice: Subject to any disclaimer, the term of this patent is extended or adjusted under 35 U.S.C. 154(b) by 0 days.

(21) Appl. No.: 14/845,568

(22) Filed: Sep. 4, 2015

(65) Prior Publication Data
US 2017/0070147 A1    Mar. 9, 2017

(51) Int. Cl.
*H02M 1/08*     (2006.01)
*H02M 1/088*    (2006.01)
*H02M 3/158*    (2006.01)
*H02M 1/00*     (2006.01)

(52) U.S. Cl.
CPC .... *H02M 3/158* (2013.01); *H02M 2001/0054* (2013.01)

(58) Field of Classification Search
CPC ........ H02M 1/08; H02M 1/088; H02M 1/096; H02M 1/084
See application file for complete search history.

(56) References Cited

U.S. PATENT DOCUMENTS

| | | |
|---|---|---|
| 5,771,166 A | 6/1998 | Lim |
| 6,400,126 B1 * | 6/2002 | Zuniga ................. H02J 7/0018 320/145 |
| 7,514,731 B2 * | 4/2009 | Shiraishi ......... H01L 21/823487 257/288 |
| 8,008,902 B2 | 8/2011 | Melanson et al. |
| 8,335,091 B2 | 12/2012 | Greenfeld |
| 8,445,974 B2 | 5/2013 | Chidambarrao et al. |
| 2003/0128015 A1 * | 7/2003 | Zuniga ................... H02M 1/08 323/282 |
| 2004/0080302 A1 * | 4/2004 | Sutardja ................. H02M 1/08 323/282 |
| 2007/0013350 A1 * | 1/2007 | Tang ................... H02M 3/1584 323/237 |

(Continued)

FOREIGN PATENT DOCUMENTS

| | | |
|---|---|---|
| DE | 10 2015 221 223.8 | 2/2016 |
| WO | WO2014003967 | 1/2014 |

*Primary Examiner* — Adolf Berhane
*Assistant Examiner* — Sisay G Tiku
(74) *Attorney, Agent, or Firm* — Saile Ackerman LLC; Stephen B. Ackerman

(57) ABSTRACT

A highly efficient voltage conversion circuit device with both asymmetric and symmetric gate voltages is disclosed, to obtain high efficiency for low or medium load currents through the asymmetric gate voltage control and high efficiency for high load currents through the symmetric gate voltage control. The device includes an intermediate voltage generation circuit unit, gate voltage driver circuits connected to the intermediate voltage generation circuit unit, and multi-phase switches connected to the asymmetric gate voltage driver circuits, etc. The intermediate voltage generation circuit unit includes a voltage reference circuit unit that provides the reference voltage for the intermediate voltage generation, an active current pull-down circuit unit, a current pull-up that is supplied by a high value resistor, and a charge storage capacitor.

25 Claims, 6 Drawing Sheets

(56) References Cited

U.S. PATENT DOCUMENTS

| | | |
|---|---|---|
| 2012/0007572 A1 | 1/2012 | Oddoart |
| 2014/0002049 A1* | 1/2014 | Schrom .................. H02M 1/08 |
| | | 323/311 |
| 2014/0266323 A1* | 9/2014 | McIntosh ................ H02M 1/08 |
| | | 327/109 |
| 2014/0306674 A1 | 10/2014 | Kondou et al. |
| 2016/0105108 A1* | 4/2016 | Childs ................. H02M 3/1588 |
| | | 323/271 |
| 2016/0233766 A1* | 8/2016 | Todorov ............. H02M 3/1584 |

* cited by examiner

VOLTAGE CONVERTERS WITH ASYMMETRIC GATE VOLTAGES

FIELD

The disclosure relates generally to variable buck converters, voltage regulators, and methods and, more particularly, to how to control the efficiency and the response of the buck converter and voltage regulators and a method thereof.

BACKGROUND

Buck converters are switching voltage regulators that operate in a step down method to provide a voltage output that is smaller than the input voltage. It accomplishes this by causing the circuit topology to change by virtue of turning on and off semiconductor devices. It uses signal switching to transfer energies into inductors. It uses a low pass filter scheme to eliminate high frequency harmonics to maintain a relatively constant output voltage and reduce the ripple of the output.

Typically buck converters use a feedback circuit to regulate the output voltage in the presence of load changes. They are more efficient at the cost of additional components and complexity. Buck converters can be made very compact. Therefore they are popularly used for mobile devices, printed circuit boards, even in integrated circuit packages.

An example of a prior art buck converter circuit 500 is illustrated in a circuit schematic block diagram in FIG. 5. The circuit 500 includes a pair of complementary switches SW1 and SW2, a driving switch pair SW11 and SW12, a driving switch pair SW21 and SW22, and phase driving buffers 570 and 572.

The phase control signal Vc1 and Vc2 are complementary to each other. Vc1 is coupled to the input of the buffer 570 while Vc2 is coupled to the input of buffer 572. The P type switch SW11 and N type switch SW12 form a complementary switch. Their input 540 is coupled to the output of 570. Their output 538 is coupled to the gate of the P type switch SW1. The P type switch SW21 and N type switch SW22 form a complementary switch. Their input 550 is coupled to the output of 572. Their output 548 is coupled to the gate of the N type switch SW2. Switch SW1 and SW2 forms a complementary switch with the output 516. 516 is usually connected to an output inductor and the output of the inductor is usually filtered by a capacitor.

In the conventional buck converter as shown in FIG. 6, to drive SW1, the drain of the P type switch SW11 is coupled to the voltage $V_{IN}$ while the source of the N type switch SW12 is coupled to the common ground $V_{COM}$. To drive SW2, the drain of the P type switch SW21 is coupled to the voltage $V_{IN}$ while the source of the N type switch SW22 is coupled to the common ground $V_{COM}$. The voltage dynamic range of the switch SW1 and SW2 are $V_{IN}$ to $V_{COM}$.

The main sources of power loss in a buck converter are resistive losses, switching losses, magnetic losses in the inductor coupled to the output $V_{LX}$, and resistive losses in the inductor coupled to the output $V_{LX}$.

The resistive losses in SW1 and SW2 are roughly in proportional to $I^2R$ where R is the resistance of SW1 and SW2 and I is the load current.

Switching losses are caused by switching SW1 and SW2. Gate capacitances of SW1 and SW2 are charged or discharged during the switching. Charging a capacitor necessarily results in losing half the energy stored on the capacitor once charged. These losses are roughly proportional to $CV^2$ where C is the gate capacitance and V is the gate voltage.

At low output currents, switching losses and the magnetic losses tend to dominate. As switching frequency increases, switching losses increase proportionally. For bucks designed for very high output currents, gate losses tend to dominate over magnetic losses and eventually restrict the maximum efficiency bucks can achieve.

Mutliphase bucks use several phases to provide the output current. Each phase has its own inductor and the inductors' outputs are then shorted together at the filter capacitor. These circuits offer several benefits over a larger single-phase buck. They are typically faster to respond with higher bandwidth and lower output impedance.

In many multi-phase bucks the buck is operated in two distinct modes: a low current mode and a high current mode. In the low current mode, often the buck is operated with less than the maximum number of phases. In this case the remaining phases are only turned on once the load current is increased.

In the present disclosure, buck efficiencies for the low and mid load currents are further improved with no penalty to the high load efficiency.

SUMMARY

A principal object of the present disclosure is to provide a switch converter.

A further object of the present disclosure is to provide a highly efficient voltage conversion circuit device with both asymmetric and symmetric gate voltages.

Another further object of the present disclosure is to improve the efficiency of different switch phases or different bucks on the same chip.

In accordance with the objects of this disclosure, a switch converter is achieved. The device comprises an intermediate voltage, gate voltage driver circuits sharing the intermediate voltage, multi-phase switches connected to the gate driver circuits, wherein the switching converter is capable of turning the gate voltage asymmetrically to provide lower switching losses and higher buck efficiency for low and medium load currents. The intermediate voltage is capable of generating an arbitrary intermediate voltage in between the supply voltage and the reference common ground that provides the asymmetric gate voltage to gate driver circuits. Gate driver circuits sharing the same intermediate voltage are capable of reducing gate capacitance losses in multi-phase switches by reducing its output gate voltage through the intermediate voltage, gate driver circuits sharing the same intermediate voltage further comprising at least two pairs of multi-phase input signals as inputs, at least two pairs of complementary switch circuits connected to multi-phase input signals for generating at least a pair of multi-phase gate voltages to following multi-phase switches, at least one intermediate voltage joining both complimentary switch circuits to break the gate voltage symmetry and reduce the dynamic range of gate voltages, and a pair of complimentary asymmetric phase signals formed by outputs of two complimentary switch circuits as the gate driving voltage. The multi-phase input signals are capable of generating the sleep mode phase when they are in phases (0°), the sync mode phase when they are out-of-phase (180°), or other phase relations. The intermediate voltage is capable of generating asymmetrical gate voltages in the following complementary switch circuits and the resultant gate voltages of every two pairs of complementary switch circuits become asymmetrical. the intermediate voltage is capable of reducing the switching voltage range of the gate and thereby reducing the capacitive loss of the following multi-phase switches to improve the buck efficiency when the load is low or medium. The intermediate voltage is chosen to be half of the supply voltage for convenience while other arbitrary intermediate voltage can also be chosen and can be shared by several phases or several bucks. Gate driver circuits sharing the same intermediate voltage can be set to the regular mode where the gate voltage range is recovered to between the regular supply voltage and the reference common voltage to maintain the high efficiency of the buck for high load currents. Multi-phase switches connected to asymmetric gate voltage drive circuits are capable of generating multi-phase switching signals for voltage switch circuits or buck converters, the multi-phase switch unit further comprising a pair of complementary multi-phase switches connected to outputs of asymmetric gate drive circuits, and an output signal at the shared junction between the pair of complementary multi-phase switch transistors. The pair of complementary multi-phase switches is capable of generating phase signals to following plurals phase inductors, filtering capacitors, and load resistors with the switch's efficiency loss proportional to the $CV^2$ where C is the gate capacitance of switches while V is the dynamic range of switching voltages. The pair of complementary multi-phase switches coupled to the asymmetrical gate voltage drive circuits have asymmetrical gate voltages that reduce the dynamic range V of switching voltages, reduce switches' efficiency loss proportional to the $CV^2$, and thereby achieve higher buck efficiency for low or medium load currents. The switch converter can be operated in one of several configurations: only the low-load phases at low loads, only the high-load phase at high loads, or only the low-load phases at low loads, all phases at high loads while the second one is preferred for optimized buck efficiency. The switch converter can be implemented for all forms of switching converters, not just bucks and for different bucks on the same chip.

Also In accordance with the objects of this disclosure, a highly efficient voltage conversion circuit device with both asymmetric and symmetric gate voltages, the device comprising an intermediate voltage generation circuit unit, gate voltage driver circuits connected to the intermediate voltage generation circuit unit, multi-phase switches connected to the asymmetric gate voltage driver circuits, wherein the voltage conversion circuit device is capable of achieving the high conversion efficiency for low and medium load currents by using asymmetric gate voltages and for high load currents by using regular gate voltages. The intermediate voltage generation circuit unit is capable of using the supply voltage to provide a stable intermediate voltage for the following connected asymmetric gate voltage driver circuits when the load current is low or medium, the intermediate voltage generation circuit unit further comprising an voltage reference circuit unit that provides the reference voltage for the intermediate voltage generation, an active current pull-down circuit unit, a current pull-up that is supplied by a high value resistor, and a charge storage capacitor. The voltage reference circuit unit is capable of generating a reference voltage from the supplied voltage through a plurality of resistors to provide the reference voltage for the intermediate voltage generation when the load current is low or medium and regular voltage circuit setup for the gate voltage drive circuits when the load current is high. The active current pull-down circuit unit is capable of reducing the charge storage in the charge storage capacitor and thereby reducing the intermediate voltage generated by the intermediate voltage generation circuit unit to avoid the intermediate voltage rises, the active current pull-down circuit unit further comprising an amplifier connected to the reference voltage generation circuit, and an NMOS device with the gate connected to the output of the amplifier and the drain to the input the amplifier, wherein the drain of the NMOS device is also connected to the charge storage capacitor and the pull-up resistor. The current pull-up that is supplied by a high value resistor is capable of charge the charge storage capacitor to avoid its intermediate voltage drops too much so that the output intermediate voltage is stabilized. The charge storage capacitor is capable of storing charges from the PMOS devices of the following gate voltage drive circuits and providing charges to the NMOS devices of the following gate voltage drive circuits, and providing a stable intermediate voltage for the asymmetric gate voltage control when the load current is low or medium. The charge storage capacitor provides an intermediate voltage for the asymmetric gate voltage control (AGVC) when the load current is low or medium that is stabilized by the active pull-down circuit unit and the pull-up circuit unit in the intermediate voltage generation circuit unit.

Also in accordance with the objects of this disclosure, a method for improving the efficiency of different switch phases or different buck on the same chip is achieved. The method comprises deciding if an automatic asymmetric gate voltage control (AGVC) working mode shall be employed according to a programmable instruction, deciding whether the AGVC shall be used based on the output load status if the automatic AGVC working mode is set according to the programmable instruction, generating the asymmetric gate voltage through an intermediate voltage for asymmetric gate voltage phase control units if AGVC shall be used and low output loads are encountered, bypassing the intermediate voltage generation through a regular reference voltage for two pairs of complimentary switch control units if AGVC shall be used and high output loads are encountered, an algorithm detecting outputs at loads and converting them into instruction signals for inputs of the gate voltage controller unit to adjust AGVC controls to multi-phase switches for low, medium, or high load currents, and feeding back the instruction signals to the gate voltage controller unit to adjust AGVC controls to multi-phase switches for low, medium, or high load currents. The method wherein deciding if the AGVC shall be used based on the output load status if the automatic AGVC working mode is set according to the programmable instruction is capable of automatically activate or deactivate the ADVC control based on the output load status. It further comprises receiving the enabling signal from the intermediate voltage generation circuit to enable the AGVC control using the intermediate voltage for asymmetric gate voltage controls if the load current is low or medium, turning on AGVC using intermediate voltages to generate asymmetric gate voltage control signals to reduce the switch loss and increase their working efficiencies if the working load current is low or medium, and turning off AGVC using a regular reference voltages to generate symmetric gate voltage control signals to reduce the switch loss and increase their working efficiencies if the working load current is high. The method wherein generating an asymmetric gate voltage through an intermediate voltage for asymmetric gate voltage phase control units if AGVC shall be used and low output loads are encountered is capable of providing asymmetric gate voltages to complimentary gate voltage drive circuits to reduce their switch losses and increase their working efficiency. It further comprises generating the intermediate voltage through the intermediate voltage generation circuit, generating the asymmetric gate voltage through two pairs of gate voltage drive circuits using the generated intermediate voltage from the intermediate voltage generation circuit, and reducing switch losses and increasing the working efficiency through asymmetric gate voltages that are lower than regular gate voltages. The method wherein an algorithm detecting outputs at loads and converting them into instruction signals for inputs of the gate voltage controller unit to adjust AGVC controls to multi-phase switches for low, medium, or high load currents is capable of automate AGVC controls dynamically based on the load status. It further comprises detecting the output current or voltage from voltage switches or buck converters, and algorithms used to generate one or more instruction signals based on sampled currents or voltages to encrypt load status information into it or them. The method wherein feeding back the instruction signals to the gate voltage controller unit to adjust AGVC controls to multi-phase switches for low, medium, or high load currents is capable of using the load status to control the AGVC setup automatically. It further comprises feeding the generated instruction signal as the feedback control signal through the feedback loop to the input of the gate voltage controller unit to adjust AGV controls to multi-phase switches for low, medium, or high load currents.

Other advantages will be recognized by those of ordinary skills in the art.

BRIEF DESCRIPTION OF THE DRAWINGS

The present disclosure and the corresponding advantages and features provided thereby will be best understood and appreciated upon review of the following detailed description of the disclosure, taken in conjunction with the following drawings, where like numerals represent like elements, in which.

DESCRIPTION

Figure 1:
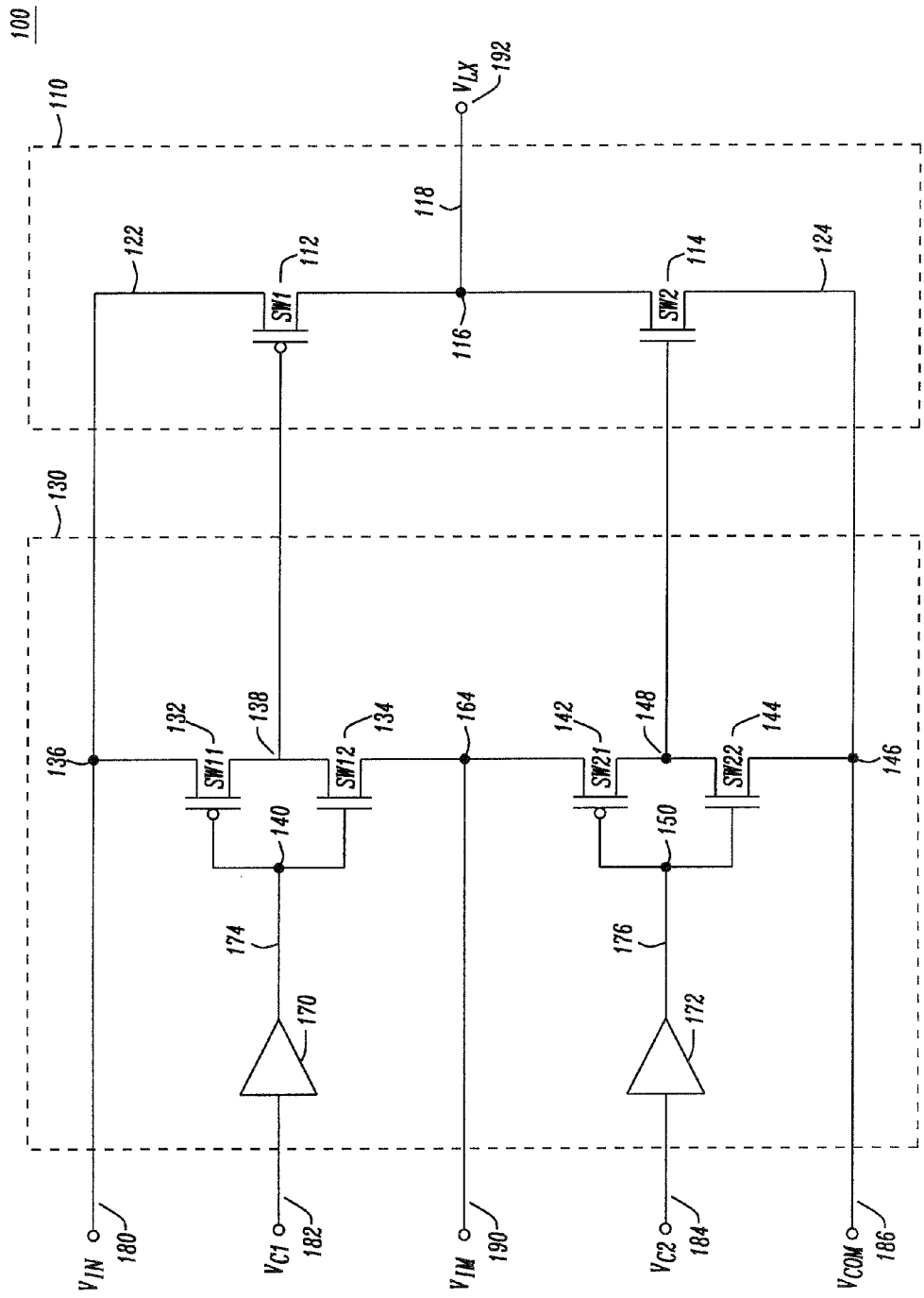
FIG. 1 is a circuit schematic diagram illustrating one example of an asymmetric gate voltage driver circuit for the buck converter in accordance with one embodiment of the disclosure.

FIG. 1 is a circuit schematic diagram illustrating one example of an asymmetric gate voltage driver circuit 100 for the buck converter in accordance with one embodiment of the disclosure. The device 100 includes a complementary phase switch 110, the gate driver circuit 130, input signals, and output signal. The complementary phase switch 110 includes an upper switch SW1, a lower switch SW2, an input 122, a circuit common reference $V_{COM}$ at 124, the output 116 from the upper switch SW1 and the lower switch SW2. The gate driver circuit 130 includes an upper driving buffer 170, a lower driving buffer 172, an upper driver switch SW11, a lower driver switch SW12, an upper driver switch SW21, a lower driver switch SW22, an input signal $V_{C1}$, and input signal $V_{C2}$, an intermediate control voltage $V_{IM}$, an input 136, a circuit common reference $V_{COM}$ at 146, an output 138 from the upper switch SW11 and the lower switch SW12, an output 148 from the upper switch SW21 and the lower switch SW22. Input signals include bias voltage input $V_{IN}$, a circuit common reference Vcom, an input signal $V_{C1}$, and input signal $V_{C2}$, and an intermediate control voltage $V_{IM}$. The output of the buck converter is $V_{LX}$.

In the complementary phase switch 110, the switch SW1 and SW2 form a complementary pair and are preferably coupled at the node 116. The drain of SW1 is preferably coupled to the bias voltage $V_{IN}$ through 122. The source of SW2 is preferably coupled to circuit common reference $V_{COM}$ through 124. The switches may be implemented in any available technology, such as MOS or bipolar or mixed technology. The output $V_{LX}$ is preferably coupled at the node 116 to both upper switch SW1 and the lower switch SW2.

In the gate driver circuit 130, the input signal $V_{C1}$ is preferably coupled to the input of buffer 170, and the input signal $V_{C2}$ is preferably coupled to the input of buffer 172. The upper switch SW11 and the lower switch SW12 form a complementary switch by shorting the gate at 140 and generating the output at 138. The upper switch SW21 and the lower switch SW22 form a complementary switch by shorting the gate at 150 and generating the output at 148. The output of buffer 170 is preferably coupled to the gate input 140 of the complementary switch jointly formed by SW11 and SW12. The output of buffer 172 is preferably coupled to the gate input 150 of the complementary switch jointly formed by SW21 and SW22. The output of the complementary switch jointly formed by SW11 and SW12 is preferably coupled to the gate of SW1. The output of the complementary switch jointly formed by SW21 and SW22 is preferably coupled to the gate of SW2. The source of SW12 and the drain of SW21 are preferably coupled at 164. The intermediate voltage is preferably coupled through 164 to the complementary switch jointly formed by SW11 and SW12 and the complementary switch jointly formed by SW21 and SW22. The drain of SW11 is preferably coupled through 136 to the bias voltage $V_{IN}$. The source of SW22 is preferably coupled through 146 to the common reference $V_{COM}$.

While the embodiment illustrates the modified gate driver circuit with only one phase output $V_{LX}$, it should be understood that multiple coupled coils with multiple phases of switches may be used in the present disclosure.

In the preferred embodiment, the gate drivers are operated with an intermediate voltage $V_{IM}$. The P type driver SW1 switches between the supply voltage $V_{IN}$ and the intermediate voltage $V_{IM}$. The N type driver SW2 switches between the intermediate voltage $V_{IM}$ and the common reference voltage $V_{COM}$.

As one of many choices, $V_{IM}$ can be set to the half of the supply voltage $V_{IN}$. Half of the supply voltage $V_{IN}$ is a convenient voltage. It can be easily generated by either a regulator, a switched capacitor charge pump, or another switching converter. However, any other intermediate voltage can be used.

If a phase is operated with a lower switching voltage, the resistance of the switch SW1 and SW2 will increase. The power loss associated with this is determined by $I^2R$ where I is the current through switches and R is the switch resistance. So the power loss is proportional to the resistance increase. So long as the device remains in the linear region, the increase in resistance will not be proportional to the decrease in voltage. So the increase in resistive losses will be small.

However, switching losses are reduced in proportional to $CV^2$. Hence, the reduction in switching losses is proportional to the square of the reduction in the switching voltage. The overall effect is to increase the efficiency of the buck at low and medium output currents.

Figure 2:
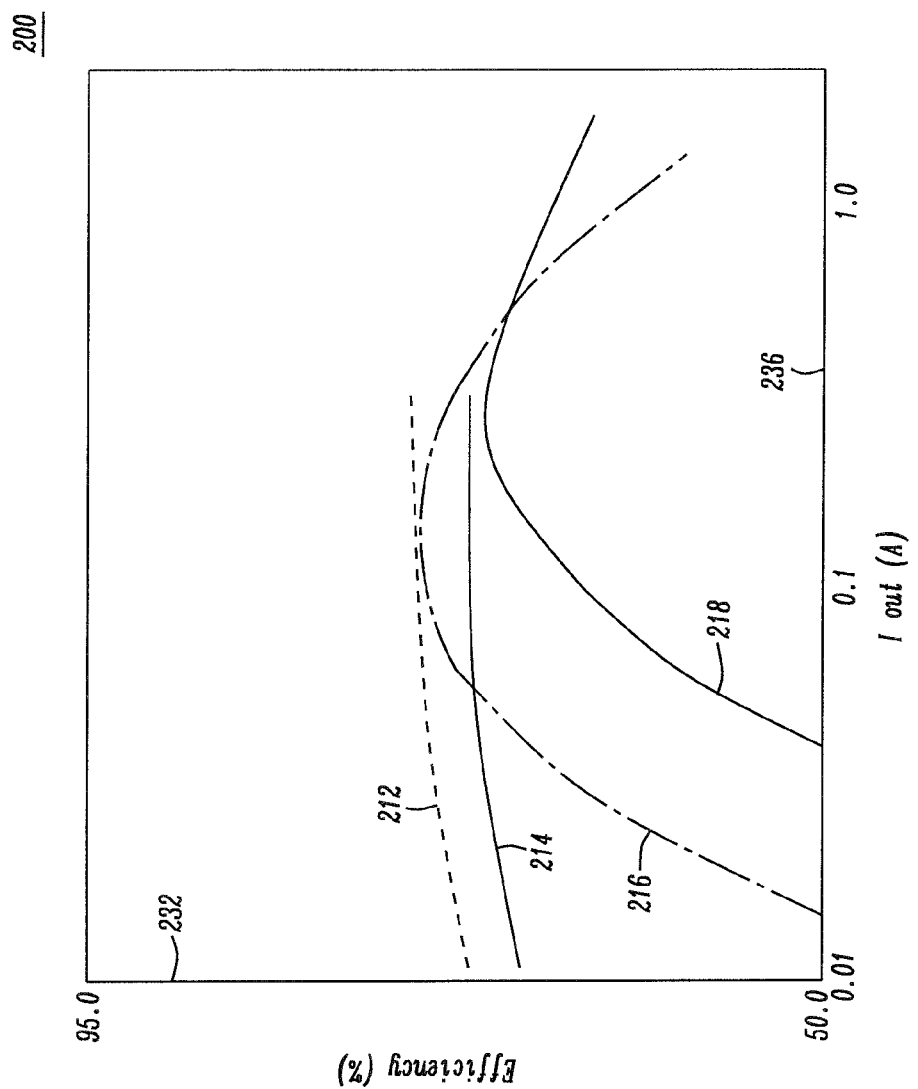
FIG. 2 is the efficiency diagram illustrating one example of an asymmetric gate voltage driver circuit for the buck converter with the improved efficiency for the low and medium output currents in accordance with one embodiment of the disclosure.

Referring now to FIG. 2, it is one example diagram of the buck efficiency improvement when the intermediate voltage in this disclosure is applied. The efficiencies under sync mode and sleep mode vs. the load current are shown when the intermediate voltage $V_{IM}$ is or is not applied. In the "sleep" mode, when the intermediate voltage $V_{IM}$ is not applied, the switch working dynamic range changes from 0 to 4 volt in this example. Its efficiency 214 varies with the load current. But when the proposed intermediate voltage $V_{IM}$ is applied, the switch working dynamic range changes within 2 volt in this example. Its efficiency 212 varies with the load current and is much better than 214. In the "sync" mode, when the intermediate voltage $V_{IM}$ is not applied, the switch working dynamic range changes from 0 to 4 volt in this example. Its efficiency 218 varies with the load current. But when the proposed intermediate voltage $V_{IM}$ is applied, the switch working dynamic range changes within 2 volt in this example. Its efficiency 216 varies with the load current and is much better than 218. This justifies the efficiency is significantly improved by using the proposed intermediate voltage $V_{IM}$ in this disclosure.

In the proposed embodiment, the efficiency from the higher gate voltage is higher at high currents. The modified low gate voltage case has higher efficiency at medium and low load currents. Hence, there is a distinct benefit in operating the low-load phases with the low gate voltage circuit, and the high-load phases with the original circuit.

In the proposed embodiment, the buck can be operated in one of several configurations to meet this condition. One condition is that only the low-load phases at low loads, only the high load phases at high loads. Another condition is the only the low-load phases at low loads, all phases at high loads. And other cases exist. It is apparent that the phases used at low loads benefit from the proposed asymmetric gate voltage control. But to achieve higher efficiency for phases used at high loads, the original circuit will be switched on.

In the proposed embodiment, the buck circuit can be designed to switch between two modes of operations: low gate switching voltage and high gate switching voltage.

In the proposed embodiment, the intermediate voltage VIM can be dynamically controlled to optimize the efficiency at different loads or output voltages. For example, by dropping the intermediate voltage at high output voltages where the P type switch resistance of SW1 is more important than the N type resistance of SW2.

In the preferred embodiment, the proposed disclosure covers all forms of switching converters, not just bucks.

In the preferred embodiment, the proposed intermediate voltage can be shared by several phases or several bucks.

In the preferred embodiment, the proposed disclosure also optimizes different bucks on the same chip. So some bucks will operate in the standard mode to source high current, where other bucks would use the intermediate voltages to optimize efficiency at low loads.

Figure 3:
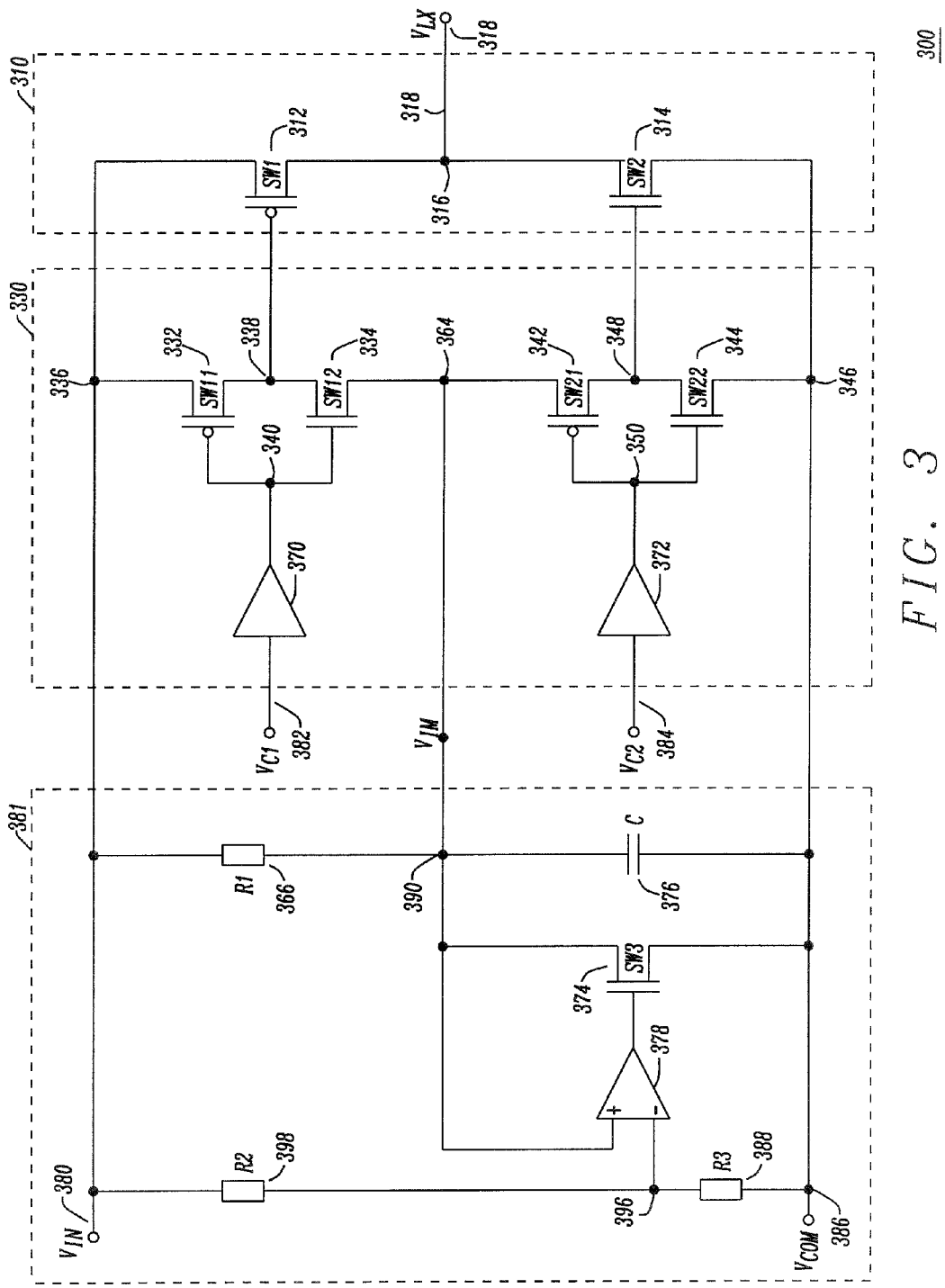
FIG. 3 is a circuit schematic diagram illustrating one example of an asymmetric gate voltage driver circuit for the buck converter with the intermediate voltage generation circuit in accordance with one embodiment of the disclosure.

Referring now to FIG. 3, it is one example diagram of an asymmetric gate voltage driver circuit 300 for the buck converter with the intermediate voltage generation circuit in accordance with one embodiment of the disclosure. The device 300 includes a complementary phase switch 310, the gate driver circuit 330, input signals, output signal $V_{LX}$, and an example asymmetric gate voltage driver circuit 381. The complementary phase switch 310 includes an upper switch SW1, a lower switch SW2, an input $V_{IN}$, a circuit common reference $V_{COM}$, the output 316 from the upper switch SW1 and the lower switch SW2. The gate driver circuit 330 includes an upper driving buffer 370, a lower driving buffer 372, an upper driver switch SW11, a lower driver switch SW12, an upper driver switch SW21, a lower driver switch SW22, an input signal $V_{C1}$, and input signal $V_{C2}$, an intermediate control voltage $V_{IM}$, an input $V_{IN}$, a circuit common reference $V_{COM}$, an output 338 from the upper switch SW11 and the lower switch SW12, an output 348 from the upper switch SW21 and the lower switch SW22. Input signals include bias voltage input $V_{IN}$, a circuit common reference $V_{COM}$, an input signal $V_{C1}$, input signal $V_{C2}$, and an intermediate control voltage $V_{IM}$. The output of the buck converter is $V_{LX}$. The asymmetric gate voltage driver circuit 381 includes a bias resister R1, a reference resister R2, a reference resister R3, a capacitor C, an amplifier 378, and an N type MOS transistor SW3.

In the complementary phase switch 310, the switch SW1 and SW2 form a complementary pair and are preferably coupled at the node 316. The drain of SW1 is preferably coupled to the bias voltage $V_{IN}$. The source of SW2 is preferably coupled to circuit common reference $V_{COM}$. The switches may be implemented in any available technology, such as MOS or bipolar or mixed technology. The output $V_{LX}$ is preferably coupled at the node 316 to both upper switch SW1 and the lower switch SW2.

In the gate driver circuit 330, the input signal $V_{C1}$ is preferably coupled to the input of buffer 370, and the input signal $V_{C2}$ is preferably coupled to the input of buffer 372. The upper switch SW11 and the lower switch SW12 form a complementary switch by shorting the gate at 340 and generating the output at 338. The upper switch SW21 and the lower switch SW22 form a complementary switch by shorting the gate at 350 and generating the output at 348. The output of buffer 370 is preferably coupled to the gate input 340 of the complementary switch jointly formed by SW11 and SW12. The output of buffer 372 is preferably coupled to the gate input 350 of the complementary switch jointly formed by SW21 and SW22. The output of the complementary switch jointly formed by SW11 and SW12 is preferably coupled to the gate of SW1. The output of the complementary switch jointly formed by SW21 and SW22 is preferably coupled to the gate of SW2. The source of SW12 and the drain of SW21 are preferably coupled at 364. The intermediate voltage is preferably coupled through 364 to the complementary switch jointly formed by SW11 and SW12 and the complementary switch jointly formed by SW21 and SW22. The drain of SW11 is preferably coupled through 336 to the bias voltage $V_{IN}$. The source of SW22 is preferably coupled through 346 to the common reference $V_{COM}$. The In the asymmetric gate voltage driver circuit 381, the resistor R2 is preferably coupled to $V_{IN}$ while the resistor R3 is preferably coupled to $V_{COM}$. R2 and R3 are both preferably coupled to the negative input of the amplifier 378. The bias resistor 366 is preferably coupled to the positive input of the amplifier 378, the drain of the PMOS device 376, and the capacitor C. Both PMOS device 376 and the capacitor C are preferably coupled to the common reference $V_{COM}$. The intermediate voltage $V_{IM}$ is generated at 390 and is preferably coupled to 364 of the gate driver circuit 330.

In the preferable embodiment, the ground of the PMOS device SW21 and the supply of the NMOS device SW12 are both preferably coupled to the intermediate voltage $V_{IM}$ at 390. They both pump charges into the intermediate supply. The capacitor can store the intermediate voltage $V_{IM}$. When the PMOS device SW21 turns on, the gate goes low, the PMOS device SW21 injects charges into the capacitor C. When the NMOS device SW12 turns on, the gate goes high, the NMOS device SW12 takes charges from the capacitor C. In most practical buck converters the PMOS device is substantially larger than the NMOS device. This means that it injects more charge than the NMOS removes. Over time then the current into the capacitor C is overall positive and the intermediate voltage $V_{IM}$ will tend to increase. The amplifier 378 controls a small active pull-down circuit, which consists of an active NMOS device SW3. It will act to discharge this current and keep the intermediate voltage $V_{IM}$ stable. A small pull-up current, supplied by a high value resistor R1, will stabilize the voltage and prevent it from falling too low. Due to the high resistance, the pull-up current is very small.

In the proposed embodiment, the asymmetric gate voltage driver circuit 381 has the benefit that it takes only the pull-up current directly from the supply. The rest of the current used to create the intermediate voltage is wasted charge from the PMOS gate driver itself. It is therefor very efficient.

Figure 4:
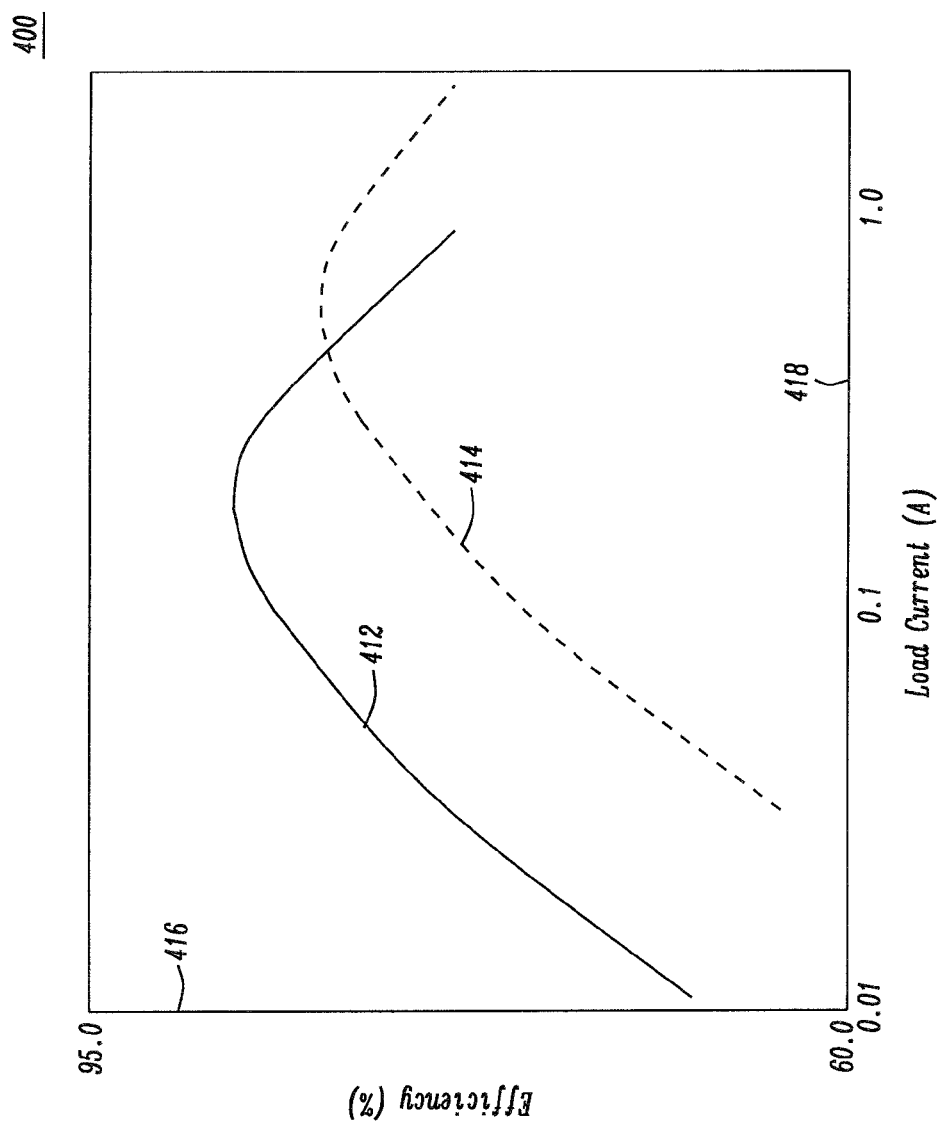
FIG. 4 is the efficiency diagram illustrating one example of an asymmetric gate voltage driver circuit for the buck converter with the intermediate voltage generation circuit in accordance with one embodiment of the disclosure.
Figure 5:
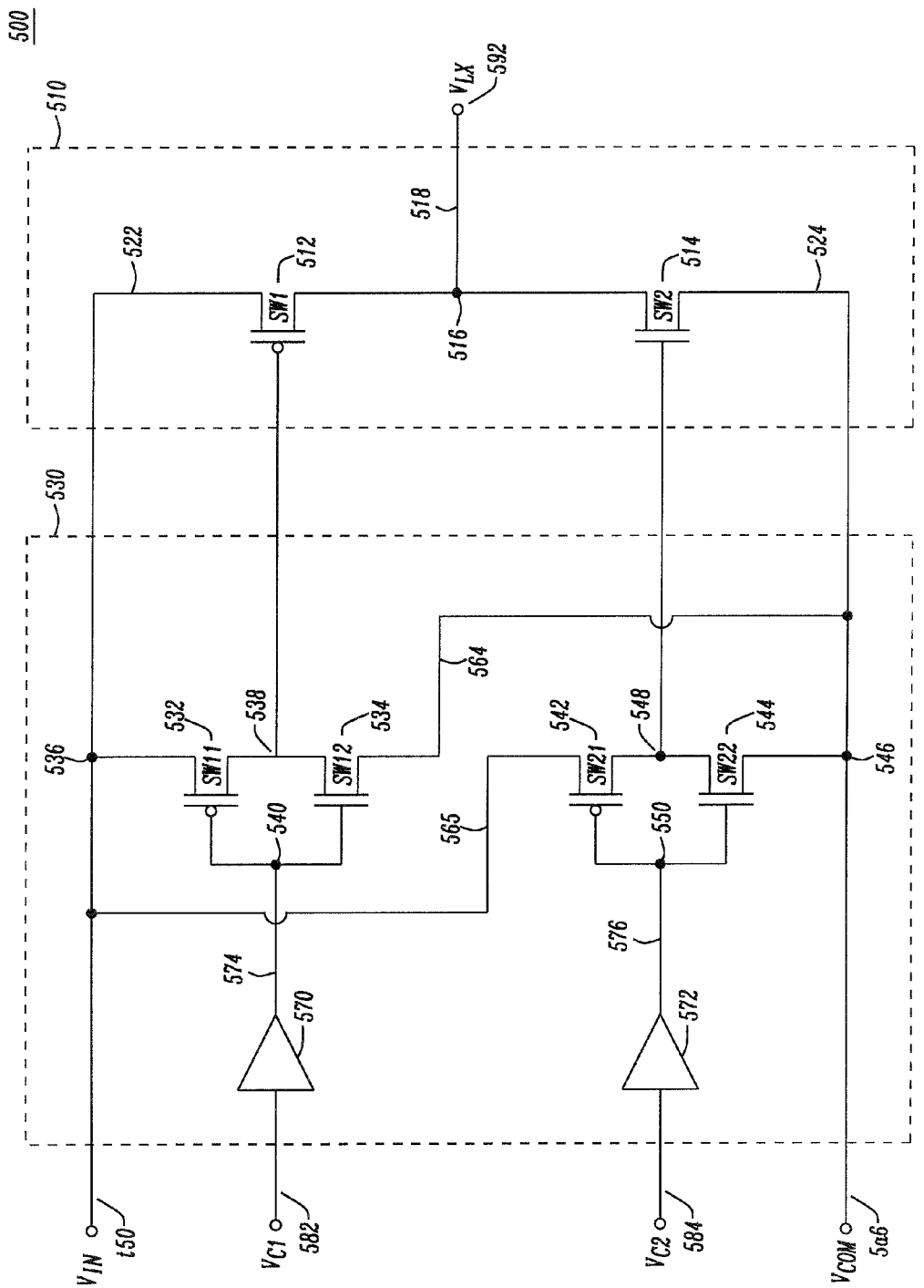
FIG. 5 is a circuit schematic block diagram illustrating a prior art, buck converter circuit.

Referring now to FIG. 4, it is one example diagram illustrating the efficiency of the buck converter with the intermediate voltage generation circuit in accordance with one embodiment of the disclosure. The efficiency curve 412 is obtained when the asymmetric gate voltage control circuit is used in the buck while efficiency curve 414 is obtained when the asymmetric gate voltage control circuit is not used in the buck. Apparently the buck efficiency 412 is much better than the efficiency 414 due to the asymmetric gate voltage control in the this disclosure.

In the proposed embodiment, the improved peak efficiency due to the asymmetric gate voltage control in this disclosure will, in reality, be higher than the original circuit. This is because no series impedance is included in the simulation data of FIG. 4. These items do not scale with the gate voltage. So it makes the improved circuit better than simply scaling the pass device.

Figure 6:
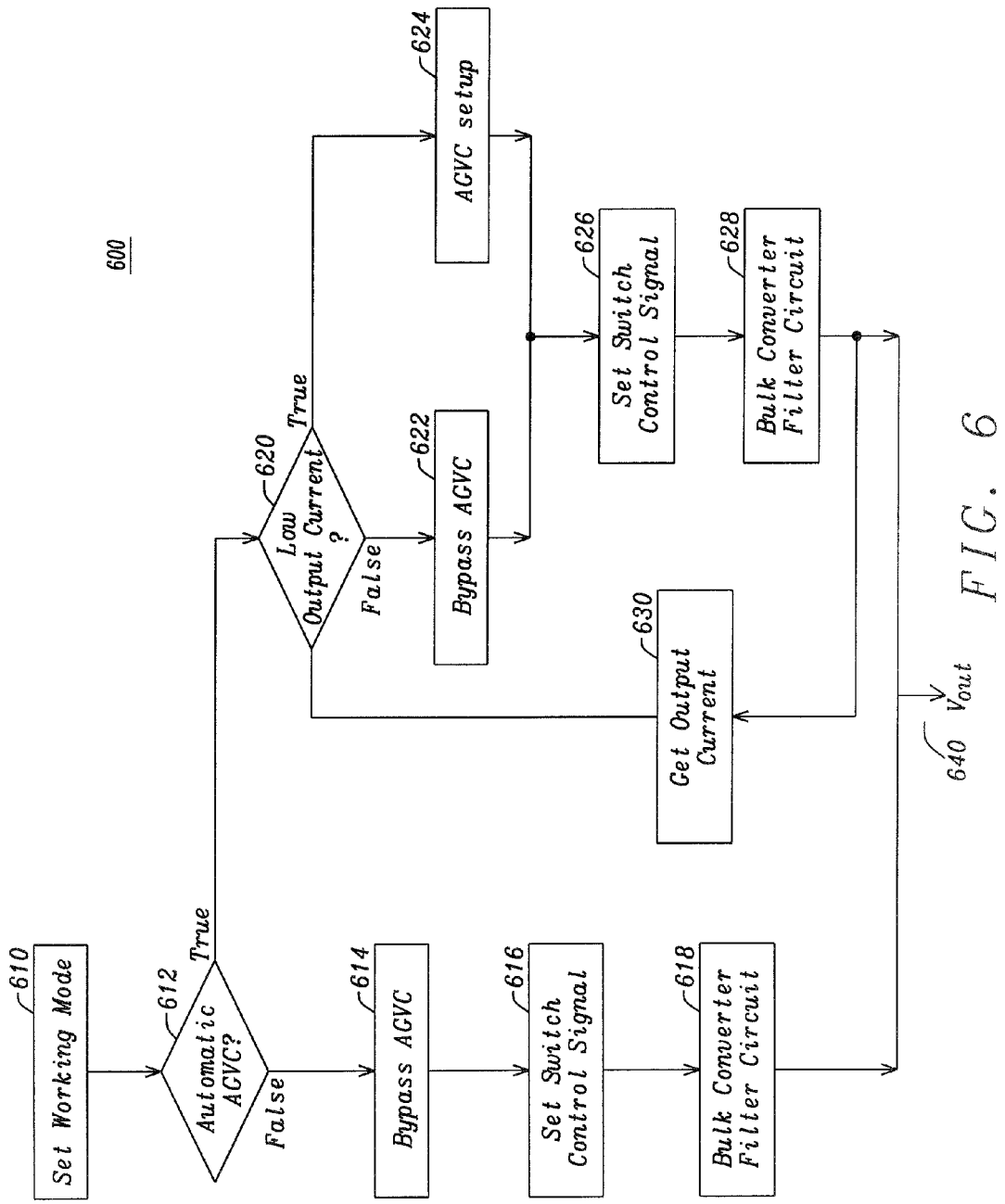
FIG. 6 is the flow chart illustrating the methodology of using an asymmetric gate voltage driver circuit with the intermediate voltage generation circuit to improve the buck efficiency for the low and medium output currents.

Referring now to FIG. 6, it shows the flowchart of the methodology of using the asymmetric gate voltage control to achieve higher efficiency for low and medium load currents from the proposed embodiment. It begins with the Set Work Mode 610, which receives the external instructions in the format of signals. The instruction is about if the automatic Asymmetric Gate Voltage Control (AGVC) shall be used. As indicated by element 612, if the automatic Asymmetric Gate Voltage Control (AGVC) is not used, the regular working mode is preferred. The AGVC circuit will be bypassed by 614 to Set Switch Control Signal through 616. The buck then works under the regular state and its output is preferably coupled to Buck Converter Filter Circuit 618 to produce the final output signal $V_{OUT}$.

As indicated by element 612, if the automatic Asymmetric Gate Voltage Control (AGVC) is used, the method will check if the output load current is low or medium, as indicated by 620. If the load current is high, the regular working mode is preferred. The AGVC circuit will be bypassed by 622 to Set Switch Control Signal through 626. However, if the load current is low or medium, AGVC working mode is preferred. It is implemented through AGVC Setup 624. Then the system goes to Set Switch Control Signal through 626. The output of the buck is preferably coupled to Buck Converter Filter Circuit 628 to produce the final output signal $V_{OUT}$.

The above detailed description of the disclosure, and the examples described therein, has been presented for the purposes of illustration and description. While the principles of the disclosure have been described above in connection with a specific device, it is to be clearly understood that this description is made only by way of example and not as a limitation on the scope of the disclosure.

What is claimed is:

1. A multi-phase switch converter, the device comprising:
a port for an input voltage (Vin);
a port for a reference common ground voltage (Vcom), wherein the switch converter is supplied by a voltage difference between voltage Vin and voltage Vcom;
gate voltage driver circuits comprising for each phase of the multi-phase switch converter a high-side gate voltage driver and a low-side gate voltage driver;
an intermediate voltage, wherein the intermediate voltage has an arbitrary intermediate voltage level between the supply voltage and the Vcom voltage that is configured, if activated, to enable the high-side gate voltage drivers to switch between the input voltage and the intermediate voltage and to enable the low-side gate voltage drivers to switch between the intermediate voltage and the Vcom voltage, thus enabling reduced switching voltages, wherein the intermediate voltage is dynamically controlled to optimize the efficiency of the switch converter at different loads or output voltages;
multi-phase switches connected to the gate driver circuits;
wherein the multi-phase switching converter is capable of turning the gate voltage of the gate voltage drivers and in consequence of the multi-phase switches with lower switching voltages to provide lower switching losses and higher efficiency for low and medium load currents.

2. The device of claim 1 wherein the intermediate voltage is capable of generating an arbitrary intermediate voltage in between the supply voltage and the reference common ground that enables the reduced switching voltages by reducing the gate voltages of the gate driver circuits.

3. The device of claim 1 wherein gate driver circuits sharing the same intermediate voltage are capable of reducing gate capacitance losses in multi-phase switches by reducing its output gate voltage through the intermediate voltage, gate driver circuits sharing the same intermediate voltage further comprising:
at least two pairs of multi-phase input signals as inputs;
at least two pairs of complementary switch circuits connected to multi-phase input signals for generating at least a pair of multi-phase gate voltages to following multi-phase switches;
at least one intermediate voltage joining both complimentary switch circuits configured to introduce reduced and full gate voltages and reduce the dynamic range of gate voltages;
and a pair of complimentary phase signals with voltage reduced formed by outputs of two complimentary switch circuits as the gate driving voltage.

4. The device of claim 3 wherein the multi-phase input signals are capable of generating the sleep mode phase when they are in phases (0°), the sync mode phase when they are out-of-phase (180°), or other phase relations.

5. The device of claim 3 wherein the intermediate voltage is capable of generating reduced gate voltages in the following complementary switch circuits.

6. The device of claim 3 wherein the intermediate voltage is capable of reducing the switching voltage range of the gate and thereby reducing the capacitive loss of the following multi-phase switches to improve the buck efficiency when the load is low or medium.

7. The device of claim 3 wherein the intermediate voltage is chosen to be half of the supply voltage for convenience while other arbitrary intermediate voltage can also be chosen and can be shared by several phases or several bucks.

8. The device of claim 1 wherein gate driver circuits sharing the same intermediate voltage can be set to the regular mode where the gate voltage range is recovered to between the regular supply voltage and the reference common voltage to maintain the high efficiency of the buck for high load currents.

9. The device of claim 1 wherein multi-phase switches connected to reduced gate voltage drive circuits are capable of generating multi-phase switching signals for voltage switch circuits or buck converters, the multi-phase switch unit further comprising:
   a pair of complementary multi-phase switches connected to outputs of reduced voltage gate drive circuits;
   and an output signal at the shared junction between the pair of complementary multi-phase switch transistors.

10. The device of claim 9 wherein the pair of complementary multi-phase switches is capable of generating phase signals to following plurality of phase inductors, filtering capacitors, and load resistors with the switch's efficiency loss proportional to the $CV^2$ where C is the gate capacitance of switches while V is the dynamic range of switching voltages.

11. The device of claim 9 wherein the pair of complementary multi-phase switches coupled to the reduced gate voltage drive circuits have reduced gate voltages that reduce the dynamic range V of switching voltages, reduce switches' efficiency loss proportional to the $CV^2$, and thereby achieve higher buck efficiency for low or medium load currents.

12. The device of claim 1 wherein the switch converter can be operated in one of several configurations: only the low-load phases at low loads, only the high-load phase at high loads, or only the low-load phases at low loads, all phases at high loads while the second one is preferred for optimized buck efficiency.

13. The device of claim 1 wherein the switch converter can be implemented for all forms of switching converters, not just bucks and for different bucks on the same chip.

14. A highly efficient voltage conversion circuit device with both reduced and full gate voltages wherein the full gate voltages swing between the input voltage and the common ground voltage, the device comprising:
   an intermediate voltage generation circuit unit, wherein the intermediate voltage has an arbitrary intermediate voltage level between the supply voltage and the Vcom voltage that is configured, if activated, to enable the high-side gate voltage drivers to switch between the input voltage and the intermediate voltage and to enable the low-side gate voltage drivers to switch between the intermediate voltage and the Vcom voltage, thus enabling reduced switching voltages, wherein the intermediate voltage is dynamically controlled to optimize the efficiency of the switch converter at different loads or output voltages;
   gate voltage driver circuits connected to the intermediate voltage generation circuit unit;
   multi-phase switches connected to the reduced gate voltage driver circuits;
   wherein the voltage conversion circuit device is capable of achieving the high conversion efficiency for low and medium load currents by using reduced gate voltages and for high load currents by using the full gate voltages.

15. The device of claim 14 wherein the intermediate voltage generation circuit unit is capable of using the supply voltage to provide a stable intermediate voltage for the following connected reduced gate voltage driver circuits when the load current is low or medium, the intermediate voltage generation circuit unit further comprising:
   a voltage reference circuit unit that provides the reference voltage for the intermediate voltage generation;
   an active current pull-down circuit unit;
   a current pull-up that is supplied by a high value resistor;
   and a charge storage capacitor.

16. The device of claim 15 wherein the voltage reference circuit unit is capable of generating a reference voltage from the supplied voltage through a plurality of resistors to provide the reference voltage for the intermediate voltage generation when the load current is low or medium and regular voltage circuit setup for the gate voltage drive circuits when the load current is high.

17. The device of claim 15 wherein the active current pull-down circuit unit is capable of reducing the charge storage in the charge storage capacitor and thereby reducing the intermediate voltage generated by the intermediate voltage generation circuit unit to avoid the intermediate voltage rises, the active current pull-down circuit unit further comprising:
   an amplifier connected to the reference voltage generation circuit;
   and an NMOS device with the gate connected to the output of the amplifier and the drain to the input the amplifier;
   wherein the drain of the NMOS device is also connected to the charge storage capacitor and the pull-up resistor.

18. The device of claim 15 wherein the current pull-up that is supplied by a high value resistor is capable of charge the charge storage capacitor to avoid its intermediate voltage drops too much so that the output intermediate voltage is stabilized.

19. The device of claim 15 wherein the charge storage capacitor is capable of storing charges from the PMOS devices of the following gate voltage drive circuits and providing charges to the NMOS devices of the following gate voltage drive circuits, and providing a stable intermediate voltage for the reduced gate voltage control when the load current is low or medium.

20. The device of claim 15 wherein the charge storage capacitor provides an intermediate voltage for the reduced gate voltage control (AGVC) when the load current is low or medium that is stabilized by the active pull-down circuit unit and the pull-up circuit unit in the intermediate voltage generation circuit unit.

21. A method to improve the efficiency of different switch phases or different bucks on the same chip, the method comprising:
   deciding if an automatic reduced gate voltage control (AGVC) working mode shall be employed according to a programmable instruction;
   deciding whether the AGVC shall be used based on the output load status if the automatic AGVC working mode is set according to the programmable instruction;

generating the reduced gate voltage through an intermediate voltage for reduced gate voltage phase control units, wherein high-side gate voltage drivers are switching between an input voltage and the intermediate voltage and low-side gate voltage drivers are switching between the intermediate voltage and a common ground voltage (Vcom), thus enabling reduced switching voltages, if AGVC shall be used and low output loads are encountered, wherein the intermediate voltage has an arbitrary intermediate voltage level between the supply voltage and the Vcom voltage that is configured, if activated, to enable the high-side gate voltage drivers to switch between the input voltage and the intermediate voltage and to enable the low-side gate voltage drivers to switch between the intermediate voltage and the Vcom voltage, thus enabling reduced switching voltages, wherein the intermediate voltage is dynamically controlled to optimize the efficiency of the switch converter at different loads or output voltages;

bypassing the intermediate voltage generation through a regular reference voltage for two pairs of complimentary switch control units if AGVC shall be used and high output loads are encountered;

wherein an algorithm detecting outputs at loads and converting them into instruction signals for inputs of the gate voltage controller unit to adjust AGVC controls to multi-phase switches for low, medium, or high load currents; and feeding back the instruction signals to the gate voltage controller unit to adjust AGVC controls to multi-phase switches for low, medium, or high load currents.

22. The method of claim 21 wherein deciding if the AGVC shall be used based on the output load status if the automatic AGVC working mode is set according to the programmable instruction is capable of automatically activate or deactivate the ADVC control based on the output load status, it further comprising:

receiving the enabling signal from the intermediate voltage generation circuit to enable the AGVC control using the intermediate voltage for reduced gate voltage controls if the load current is low or medium;

turning on AGVC using intermediate voltages to generate reduced gate voltage control signals to reduce the switch loss and increase their working efficiencies if the working load current is low or medium; and turning off AGVC using a regular reference voltages to generate full gate voltage control signals to reduce the switch loss and increase their working efficiencies if the working load current is high.

23. The method of claim 21 wherein generating a reduced gate voltage through an intermediate voltage for reduced gate voltage phase control units if AGVC shall be used and low output loads are encountered is capable of providing reduced gate voltages to complimentary gate voltage drive circuits to reduce their switch losses and increase their working efficiency, it further comprising:

generating the intermediate voltage through the intermediate voltage generation circuit;

generating the reduced gate voltage through two pairs of gate voltage drive circuits using the generated intermediate voltage from the intermediate voltag generation circuit; and reducing switch losses and increasing the working efficiency through reduced gate voltages that are lower than regular gate voltages.

24. The method of claim 21 wherein an algorithm detecting outputs at loads and converting them into instruction signals for inputs of the gate voltage controller unit to adjust AGVC controls to multi-phase switches for low, medium, or high load currents is capable of automate AGVC controls dynamically based on the load status, it further comprising:

detecting the output current or voltage from voltage switches or buck converters;

and algorithms used to generate one or more instruction signals based on sampled currents or voltages to encrypt load status information into it or them.

25. The method of claim 21 wherein feeding back the instruction signals to the gate voltage controller unit to adjust AGVC controls to multi-phase switches for low, medium, or high load currents is capable of using the load status to control the AGVC setup automatically, it further comprising:

feeding the generated instruction signal as the feedback control signal through the feedback loop to the input of the gate voltage controller unit to adjust AGV controls to multi-phase switches for low, medium, or high load currents.

* * * * *